(12) United States Patent
Chapman et al.

(10) Patent No.: US 9,288,151 B2
(45) Date of Patent: Mar. 15, 2016

(54) POWER MANAGER AND METHOD

(75) Inventors: Thomas Malcolm Chapman, Southampton (GB); Alan Ford, Southampton (GB); Benedict Toner, Alresford (GB); Abigail West, Romsey (GB); Robert Zakrzewski, Eastleigh (GB)

(73) Assignee: Roke Manor Research Limited, Romsey Hampshire (GB)

( * ) Notice: Subject to any disclaimer, the term of this patent is extended or adjusted under 35 U.S.C. 154(b) by 346 days.

(21) Appl. No.: 13/500,789

(22) PCT Filed: Oct. 12, 2010

(86) PCT No.: PCT/GB2010/051719
§ 371 (c)(1),
(2), (4) Date: Nov. 2, 2012

(87) PCT Pub. No.: WO2011/055131
PCT Pub. Date: May 12, 2011

(65) Prior Publication Data
US 2013/0039179 A1    Feb. 14, 2013

(30) Foreign Application Priority Data

Nov. 4, 2009  (GB) .................................. 0919329.3
Feb. 3, 2010  (GB) .................................. 1001725.9

(51) Int. Cl.
*H04W 4/00*     (2009.01)
*H04L 12/891*   (2013.01)
(Continued)

(52) U.S. Cl.
CPC ............. *H04L 47/41* (2013.01); *H04L 47/22* (2013.01); *H04L 47/2475* (2013.01); *H04W 8/22* (2013.01); *H04W 72/1205* (2013.01); *Y02B 60/33* (2013.01)

(58) Field of Classification Search
USPC ........... 370/429, 413, 412, 395.21, 332, 318, 370/311, 230.1
See application file for complete search history.

(56) References Cited

U.S. PATENT DOCUMENTS

| 7,460,476 B1 | 12/2008 | Morris et al. |
| 2005/0152324 A1 | 7/2005 | Benveniste |

(Continued)

FOREIGN PATENT DOCUMENTS

| EP | 1503545 | 2/2005 |
| EP | 1912459 | 4/2008 |

(Continued)

OTHER PUBLICATIONS

International Search Report and Written Opinion in PCT/GB2010/051719 mailed Jan. 11, 2011.

(Continued)

*Primary Examiner* — Zewdu A Beyen
(74) *Attorney, Agent, or Firm* — Banner & Witcoff, Ltd.

(57) ABSTRACT

A power manager for a mobile device comprises a traffic shaping unit (30) and a management unit (26). The traffic shaping unit is incorporated into a networking layer (8) of a mobile device architecture. The traffic management unit spans application layer (7) and networking layer (8) of the mobile device architecture. The traffic shaping unit and management unit are connected via a feed path (73). The management unit (26) is provided with inputs (74) to receive measurements of external parameters (65 to 69). The management unit further comprises a processor (20) to process the received measurements and a traffic shaping function generator (21) to receive the processed measurements and generate a traffic shaping function. The management unit (26) inputs the generated traffic shaping function to the traffic shaping unit (30) via the feed path (73), whereby the traffic management unit controls transmissions from the mobile device.

24 Claims, 7 Drawing Sheets

(51) Int. Cl.
*H04L 12/815* (2013.01)
*H04L 12/859* (2013.01)
*H04W 8/22* (2009.01)
*H04W 72/12* (2009.01)

(56) References Cited

U.S. PATENT DOCUMENTS

| | | |
|---|---|---|
| 2006/0025181 A1 | 2/2006 | Kalofonos et al. |
| 2006/0133268 A1* | 6/2006 | Wu et al. ............ 370/229 |
| 2006/0160508 A1 | 7/2006 | Narayanaswami et al. |
| 2006/0203724 A1* | 9/2006 | Ghosh et al. ......... 370/229 |
| 2006/0285526 A1* | 12/2006 | Jang et al. ........... 370/338 |
| 2007/0286222 A1 | 12/2007 | Balasubramanian |
| 2007/0298762 A1* | 12/2007 | Morris ................ 455/405 |
| 2008/0123741 A1* | 5/2008 | Li et al. ............ 375/240.12 |

FOREIGN PATENT DOCUMENTS

| | | |
|---|---|---|
| WO | 2006095323 | 9/2006 |
| WO | 2008115813 | 9/2008 |
| WO | 2010039022 | 4/2010 |

OTHER PUBLICATIONS

Combined Search and Examination Report Under Sections 17 and 18(3) for GB1001725.9 dated May 6, 2010.

Kravets, et al., "Application-Driven Power Management for Mobile Communication", Wireless Networks, ACM, vol. 6, No. 4, Sep. 1, 2000.

Sheth, et al., "Adaptive Power Control and Selective Radio Activation for Low-Power Infrastructure-Mode", Multimedia Signal Processing, 2002 IEEE Workshop on Dec. 9-11, 2002, May 19, 2003.

* cited by examiner

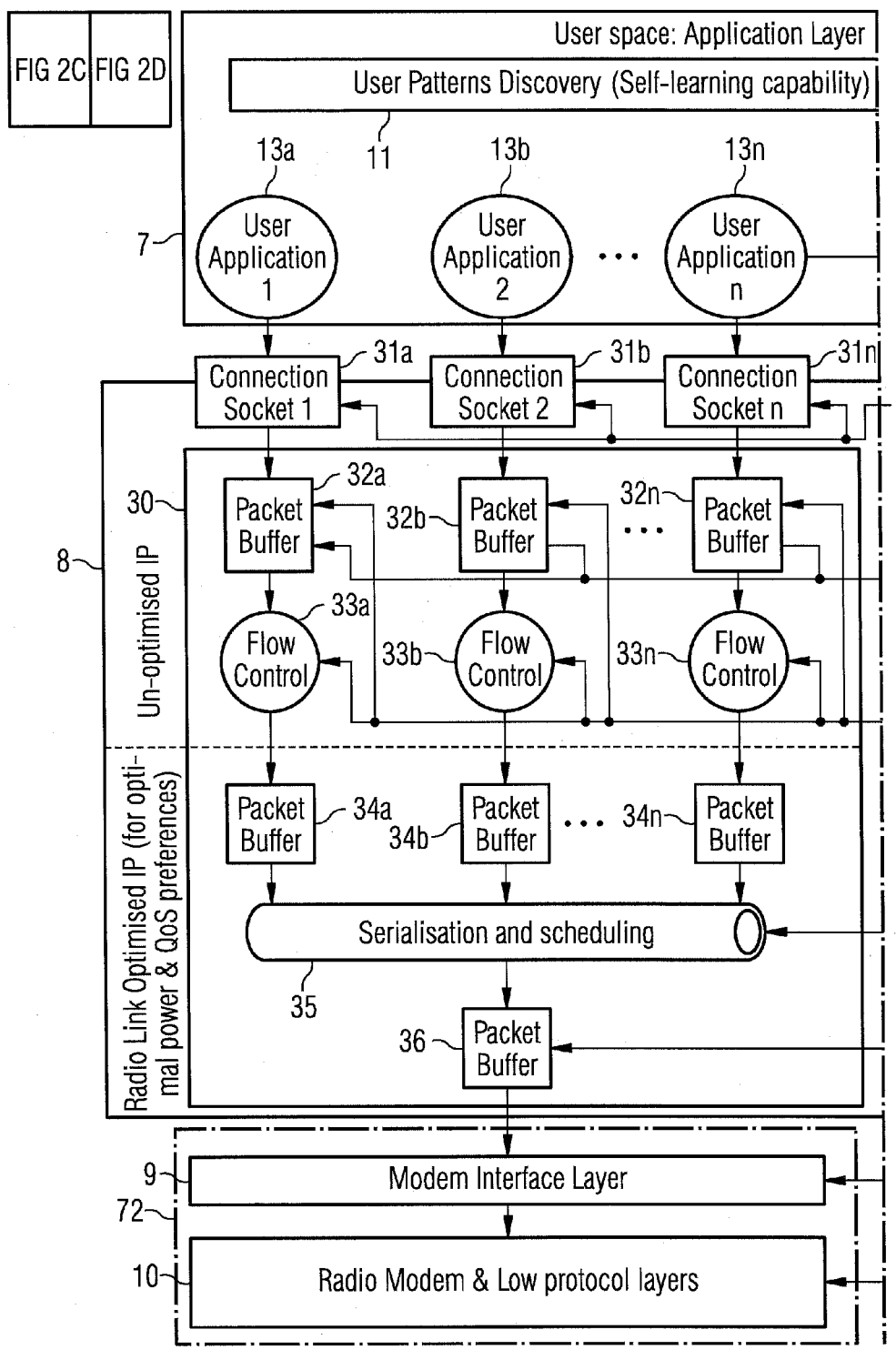

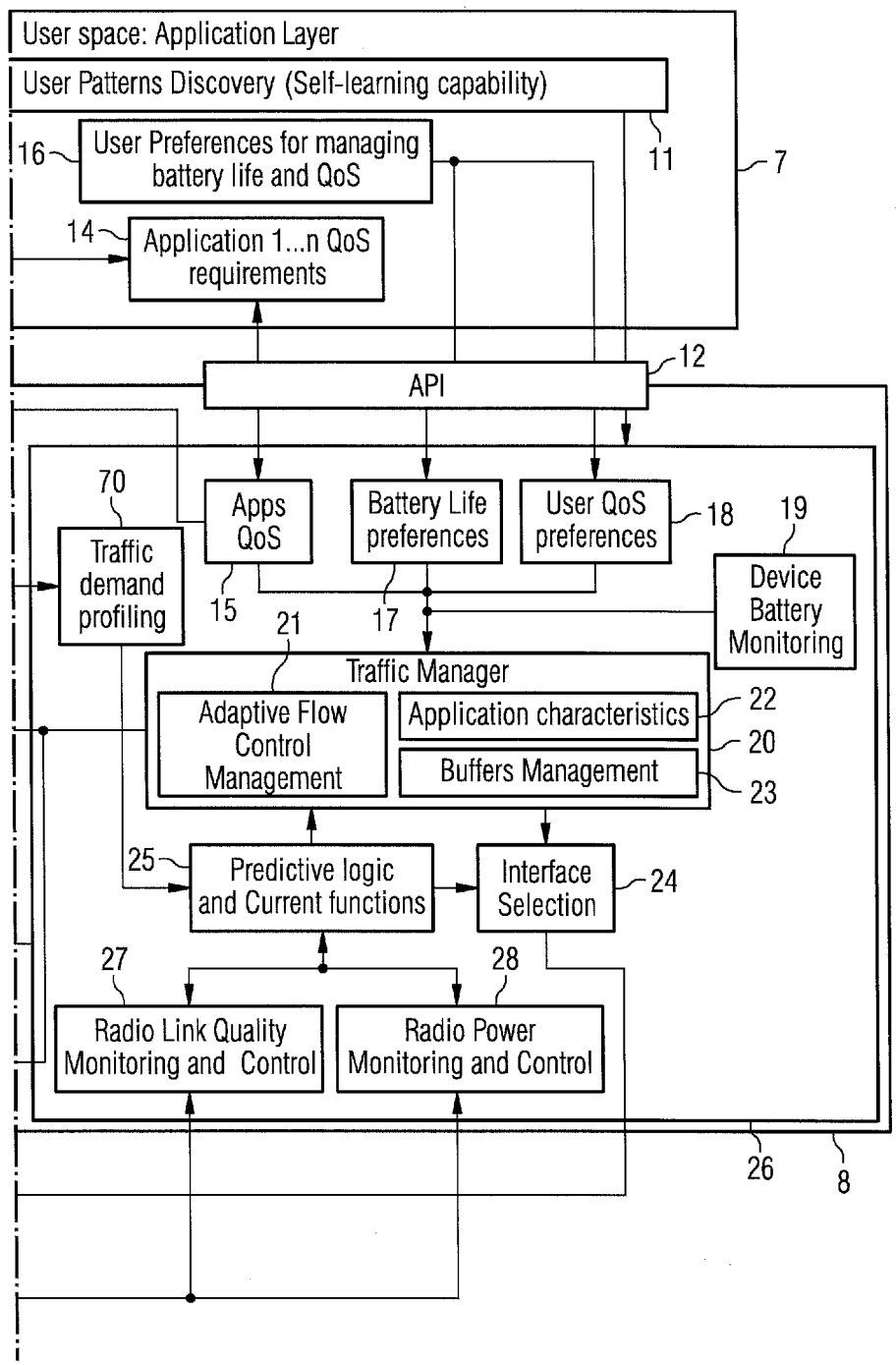

POWER MANAGER AND METHOD

The present invention relates to a power manager and a method of power management in a mobile device, particularly for a network connected mobile device.

Sufficient battery life is important to users of mobile devices. For mobile communications systems, where the mobile device is a user equipment (UE), extending the battery life is an important consideration for the UE vendors. Typical data applications have a best effort traffic profile, and multi-application systems have uncoordinated traffic profiles and radio usage is inefficient. In all mobile devices, there is a trade off in that users require smaller lighter devices, but also want these devices to perform more tasks for longer between recharging, so need more effective batteries. Users with existing devices are unlikely to purchase new batteries as technology improves, but will become used to other newer devices performing better, so there may be a market for performance upgrades to legacy equipment.

Conventionally, improvements in battery life by power savings have been achieved by setting particular applications or interfaces to be either on or off, dependent upon predefined battery levels being reached. Another way of increasing battery life is by controlling discharge characteristics or by applying a need based wake up to a device in sleep mode. WO2008/115813 describes sleep optimization for mobile devices in a broadband network. However, the method described in this document may result in the device being permanently on when multiple uncoordinated applications are active. US2010011056 describes a method and system for opportunistic delivery of less-than-best-effort application data over communications networks and US2006/0025181 describes a system and method for managing a wireless connection to reduce power consumption of a mobile terminal. However, both of these documents require cooperation and integration with the network in order to reduce power consumption. WO2008/043718 describes a system and method for mobility management in which the choice of access network with which the mobile is affiliated is dependent upon power consumption and aims to achieve service continuity with reduced power consumption.

In accordance with a first aspect of the present invention, a power manager for a mobile device comprises a traffic shaping unit and a management unit; wherein the traffic shaping unit is incorporated into a networking layer of a mobile device architecture; wherein the traffic management unit spans application layer and networking layer of the mobile device architecture; and wherein the traffic shaping unit and management unit are connected via a feed path; wherein the management unit is provided with inputs to receive measurements of external parameters; wherein the management unit further comprises a processor to process the received measurements; and a traffic shaping function generator to receive the processed measurements and generate a traffic shaping function; and wherein the management unit inputs the generated traffic shaping function to the traffic shaping unit via the feed path; whereby the traffic management unit controls transmissions from the mobile device.

The power manager manages the flow of network traffic from each individual networked application passing through the networking layer, so that the instantaneous throughput capacity is maximised and transmission time is minimised. This traffic management is within and under the control of the mobile device, rather than being controlled by the network which has a different agenda, so is able to respond to the requirements of the mobile device.

Preferably, when the traffic shaping unit receives inputs from the traffic management unit for applications which have been synchronised in the application layer, no further traffic shaping function is applied to those inputs.

When the synchronisation in the application layer is the application of the traffic shaping function, then no further traffic shaping function need be applied in the networking layer because it has already been applied.

Preferably, the traffic shaping unit receives inputs from one or more uncoordinated applications.

The mobile device may be running multiple applications from different sources (typically applications which generate "best effort" data traffic), which do not have any co-ordination between them, regarding time of transmission.

In one embodiment, the management unit generates a traffic shaping function for the, or each application in response to at least one of the external parameters. In this option, the shaping function uses at least one of the external parameters, either alone, or in combination with others of the external parameters in order to generate a traffic shaping function for each application.

In another embodiment, a single traffic shaping function is applied to the, or each application. In this alternative, a single global traffic shaping function is generated and applied to all of the applications to reduce the power requirement. This requires less processing, but does not give the same degree of personalisation.

Preferably, the traffic shaping unit receives inputs from a plurality of applications; wherein the traffic shaping function generator generates a traffic shaping function for each of the plurality of applications; and wherein the manager further comprises an aggregation stage whereby the generated traffic shaping function aggregates inputs from the plurality of applications before outputting an aggregated signal for transmission.

This reduces the transmission overhead by combining the requirements of multiple applications. Aggregation and delay give the transmissions more of a burst profile and reduce the time for which power is required.

Preferably, the aggregated signal is aligned with control traffic of the mobile device.

A further reduction in transmission overhead is achieved by transmitting the aggregated signals at a time when the device would be in use for transmission of control traffic anyway.

Preferably, the external parameters comprise at least one of wireless link quality, low layer radio traffic, battery state, user preferences for QoS and application behaviour.

Preferably, the management unit determines user requirements from the external parameters.

Preferably, the management unit further spans a radio interface layer.

Preferably, the traffic shaping function has the effect of reducing regularity of transmission.

For information which is regularly updated, such as temperature readings, weather reports or traffic information, the user experience may not be significantly degraded by reducing the update regularity to a fraction of the standard rate, whereas the power savings are worthwhile.

Preferably, the traffic shaping function aligns the signal transmissions with control traffic of the mobile device.

Preferably, the traffic shaping unit monitors transmission control protocol internet protocol (TCP-IP) user traffic acknowledgements and the traffic shaping function generator generates a modified traffic shaping function to block transmission of the acknowledgments.

TCP-IP uses acknowledgements to communicate and deliver data reliably. However, in power terms, this sending of small amounts of data as and when they occur, resulting in the communications being turned on and off frequently, is inefficient. In some cases, the delay applied to set up and tear down in combination with small amounts of TCP-IP acknowledgment data may result in the connection never being torn down. By blocking transmission of the acknowledgements, power management is improved and the link quality can be maintained. Alternatively, if the acknowledgements are required, then they can be aggregated within the mobile device and sent in one transmission, as quickly as possible.

Preferably, the processor is a distributed processor.

The processor may be single processing unit within the management unit, or alternatively, the processor may be distributed and associated with individual inputs from the application layer to the networking layer.

Preferably, the power manager further comprises a store and a comparator to compare a battery level parameter with a set of stored threshold levels; and wherein the traffic shaping function generator generates a traffic shaping function to modify operation of the mobile device in accordance with the output of the comparator.

Preferably, the traffic management unit further controls an output of the user device to offer options or warnings to the user.

Preferably, the output provides an audible, or visual or tactile warning.

Preferably, the outputs are a loud speaker, display, or motive unit of the mobile device.

In accordance with a second aspect of the present invention, a method of power management in a mobile device comprises measuring available power level; receiving data from one or more user applications for transmission; receiving measurements of one or more external parameters; checking predetermined settings for the or each parameter; comparing requirements for a requested service with parameter setting and power levels; generating a traffic shaping function in response to the received measurements and the comparison; and inputting the generated traffic shaping function to a traffic shaping unit.

Preferably, the method further comprises applying the generated traffic shaping function to the data to modify format or time of transmission.

The present invention provides a method of managing the traffic in a UE, terminal, or other mobile device by modifying format, or time of transmission to achieve greater efficiency of power usage.

Preferably, when the traffic shaping unit receives inputs from the traffic management unit for applications which have been synchronised in an application layer, no further traffic shaping function is applied to those inputs.

Preferably, the parameters comprise two or more of radio link quality, application behaviour, radio interface control-traffic requirements; and battery state.

Preferably, the parameters further comprise user quality of service levels.

Preferably, the method further comprises aggregating data from a plurality of applications.

Preferably, transmissions are scheduled to start aligned with control traffic or on receipt of downlink traffic.

Preferably, uplink transmission time is determined from a combination of application requirements, battery charge level, radio propagation conditions, presence of downlinks traffic and system specific parameters.

Preferably, the mobile device operates a modified transmission control protocol (TCP) protocol, whereby transmission of TCP control information is reduced, during periods of high data volumes.

The modified TCP control traffic reduction function uses the robustness of the TCP protocol to allow removal of a proportion of TCP control information so that a wireless interface does not have to be powered on so often. If the wireless interface is predominantly receiving a large amount of data and the wireless interface transmitter is mostly needed for the transmission of TCP control information, this modified function can result in significant savings.

Preferably, an interface for transmission is selected according to the received measurements.

Preferably, an interface selection function determines which of a number of wireless interfaces are available for use.

Preferably, the interface selected is chosen to provide the lowest demand from the power source, for the total time required to communicate the instantaneous traffic demands.

A mobile device may be within range of one type of transmitter, e.g. WiMAX, when on the limits of its range for another e.g. cellular. By informing the device in response to measurements taken, the user can connect via a route which has the most efficiency in power terms.

An example of a power manager and a method according to the present invention will now be described with reference to the accompanying drawings in which FIG. 1 is a block diagram of a typical network in which a power manager and the method of the present invention can be used;

FIG. 2b shows one example of a more detailed architecture for implementing the power manager and the method of the present invention;

The power manager of the present invention allows the power consumption of a mobile device that may operate multiple applications and use wireless interfaces to provide connectivity to a remote network to be managed in such a way that the average power requirement of the wireless interface is reduced, allowing the user to maintain services for longer in conditions where the available battery is reducing. The wireless interface capacity is used efficiently for the shortest possible time, by performing various functions as described in the examples given below. By each transmission sending more data in a less time, less energy is required which extends the battery life.

Figure 1:
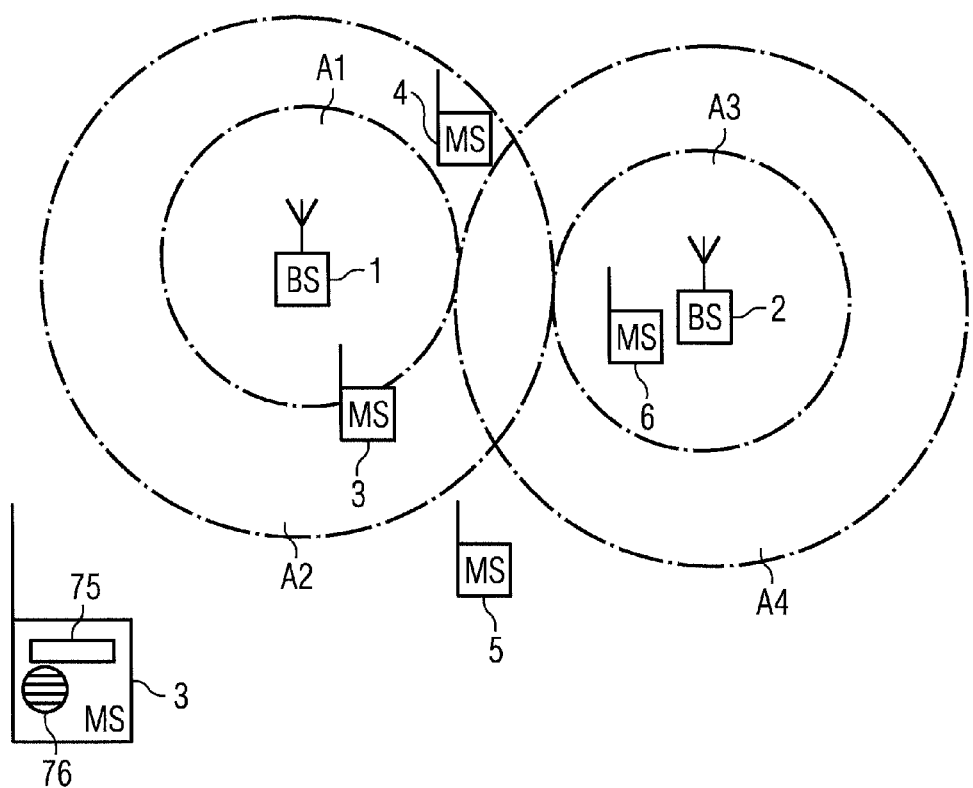

The example of FIG. 1 is described with reference to base stations and mobile devices of a wireless communication network, but the invention is not limited to these. Any wireless mobile network may make use of the power manager and method of the present invention. The mobile devices may include phones, PDAs, laptops and any other wireless networked mobile device. Typically, a mobile device 3 includes a display 75 and a loudspeaker 76. In FIG. 1 mobile devices 3, 4, 5, 6 move in and out of range of various base stations 1, 2.

Around each base station are circles A1 to A4 indicating signal quality. This is good within A1 and A3, average within A2 and A4, but poor outside A2 and A4. Whenever a user attempts to connect either to download data or to send communications, the power requirement, in both time and limit will be dependent upon the signal quality. If, in addition, the battery power in the mobile device is low, then a transmission from MS 5 is likely to consume a significant proportion of the remaining battery life and should be suppressed until MS 5 is well within range of a base station. In the same circumstances, a transmission from MS 6 to BS 2 is likely to require less energy and can occur using a smaller proportion of the remaining battery.

Cellular measurements and location information can be used to determine the speed of the mobile device and manage the traffic appropriately. For example, by obtaining the speed and location, the power manager can determine if the mobile device is active in a vehicle and the traffic management function can shape the traffic in order to minimise distractions. This is useful if the mobile device user is driving the vehicle and does not want to be distracted by incoming messages or alerts, combining optimal power management with appropriate usage. A warning that the feature was active may be presented to the user and overridden if the user was not operating the vehicle.

Figure 2A:
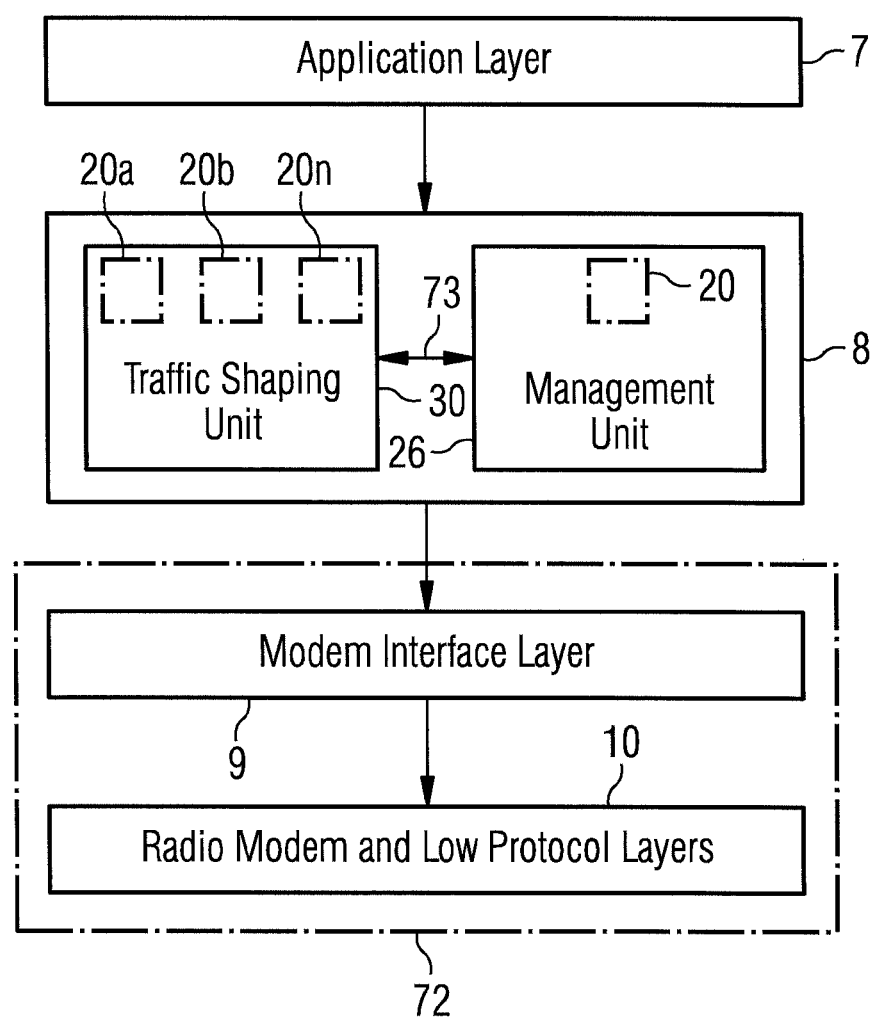
FIG. 2a is a block diagram of a basic architecture for implementing a power manager according to the present invention.

A basic example of system architecture is illustrated in FIG. 2*a*. This comprises an application layer 7, a networking layer 8 and a radio interface layer 72. Signals from user applications in the application layer 7 are input 71 to the networking layer 8. Within this layer, a management unit 26 provides traffic shaping function generation based on inputs 74 of measurements from external parameters 65 to 69 and a traffic shaping unit 30 applies the generated function to the signals from the application layer 7. Using individual application flow control, the traffic shaping unit 30 is able to move the timing of outbound traffic, so that this coincides for different applications and can be sent in a single transmission, or else change the update rate for a single application. Within the management unit a processor, or traffic manager 20 processes received inputs and controls provision of the traffic shaping function to the traffic shaping unit via a feed path 73. However, part of the processor function 20*a* to 20*n* may be distributed across the inputs from the application layer 7. The shaped signals are combined and output to the radio interface layer 72, which in this example comprises a modem interface layer 9 and radio modem and low protocol layer 10.

A more detailed example of the system architecture is illustrated in FIG. 2*b*. In the application layer 7, a user patterns discovery unit 11, which monitors user activity exploiting its self-learning capability to discover patterns in the way applications and services are used, feeds into the networking layer 8. In this example, this is via an application programming interface (API) 12 which may be used by applications and system user space services to communicate with traffic shaping and interface selection module, but this interface 12 is optional. Where this interface is present, there may be sufficient communication through the API 12 to the applications to enable flow control to be carried out by the application and for synchronisation of the various applications. In this case, there is no need for the traffic shaping unit 30 to apply the generated function to the signals from the application layer 7, so the traffic shaping unit is effectively transparent to the inputs which it receives.

Figure 5:
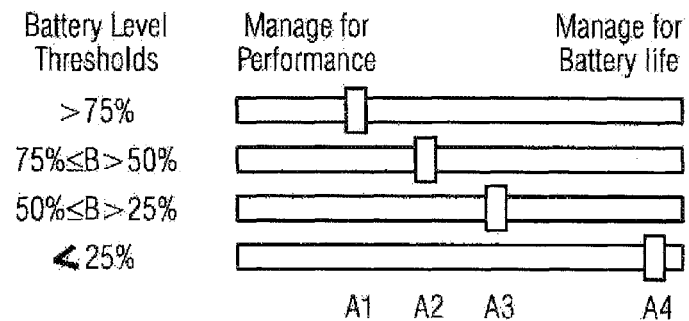
FIG. 5 illustrates example mobile device user control of battery thresholds and changes in priority as these thresholds are reached; and, FIG. 6 shows schematically how the power manager of the present invention is incorporated into existing mobile networking stack architecture.

Each user application ($13_{a \ldots n}$), which includes user programmes and system services which run and reside in user space, may communicate its Quality of Service (QoS) requirements and use designated sockets for sending/receiving data. The user applications may communicate via the API 12, application QoS requirements from module 14, which manages application QoS requirements and maps them to internal signals used in in the management unit 26 for traffic shaping and interface selection. The application interface allows the user applications to be written with that interface in mind, knowing the type of traffic shaping function which may be applied, thus enabling the application to make its attempts at transmission in accordance with the best interests of the user device. Also in the application layer 7, a user preferences module 16 is used to manage battery life preferences 17 and QoS preferences 18 internal to the management unit 26 of the networking layer 8, so that a traffic manager 20 can determine traffic shaping functions that provide a tradeoff of power management and mobile device performance to satisfy the users configuration according to the absolute level of remaining battery determined by device battery monitoring module 19. FIG. 5 illustrates a possible implementation of the user preferences module 16. The battery life preferences module 17 records user generic battery life settings and maps them to internal signals used in the management unit 26. The device battery monitoring module 19 monitors the remaining battery power level (discharge level) and feeds this into the traffic manager 20, with the application QoS 15 battery life preferences 17 and user QoS 18 preferences. The user QoS preferences module 18 manages user global/generic QoS requirements and maps them to internal signals used in traffic shaping and interface selection block.

The traffic manager 20 comprises adaptive flow control management 21, application characteristics 22 and buffer management 23 and manages flow control mechanisms, buffer sizes and application specific requirements. An output of the traffic manager 20 is fed via interface selection module 24 to the modem interface layer 9. The interface selection module 24 determines and coordinates interface selection for multi radio system terminals and the modem interface layer 9 is used to route data to the appropriate radio interface layer 72. Further input to the traffic manager 20 comes from a predictive logic and current functions module 25, which receives data from a radio link quality monitoring and control module 27 which monitors radio link quality and may reconfigure radio link in order to meet quality targets: and from a radio power monitoring and control module 28 which monitors power levels and coordinates power transmission levels, as well as a traffic demand profiling module 70, which monitors and profiles application demand for data transfer services. Monitoring and control module 27 gives the user the option of moving to a better location, or one with better coverage and the traffic shaping function will be related to the available coverage. Since low quality coverage requires more transmit power, it is less desirable to transmit in that location. Moving to a location with better coverage allows the time for which transmission takes place to be reduced. The predictive logic and current functions module 25 processes internal and external inputs and indicates reactive or predictive actions to be taken by other modules. The external inputs may be provided by external entities which assist operations in a device.

The prediction function in module 25 may provide information to the traffic manager 20, so that the management unit 26 can attempt to favour network communication during a period when network conditions are optimal, providing a maximum throughput capacity that can be used for a minimum duration and hence use the least power consumption, where the prediction function utilises network quality information from the available and supported wireless interfaces. When used to create trend information and coupled with the network information about other networks in the vicinity, the traffic control can be scheduled to take place at the optimal time. One embodiment of such a system providing external inputs is the media independent handover (MIH) framework as defined in IEEE 802.21 specification. IEEE 802.21 broadcasts information about availability of other networks for the user. Modern mobile handsets may have more than one available interface, such as 2G, 3G, WiFi and Bluetooth. Since cellular communications have a relatively long range, they tend to require more power, so if another interface is or will shortly be within range, the user can choose that interface on a temporary basis to give a reduction in total power consumption, without any impact on the applications which can be used. For example, it might be most efficient to delay data transmission until within range of a WiFi connection, switch to the WiFi connection, which has a large capacity, so more aggregated data can be transmitted by that route, whilst close, then switch back to the cellular connection as the user moves away.

A second part of the networking layer 8 is a multi application traffic shaping unit 30. From the application layer 7, each user application ($13_{a \ldots n}$) is provided with a connection socket 31$a \ldots n$. These are service access points which are used by applications in order to send or receive data. The sockets are configured by the traffic shaping and interface selection functional block 26 based on various system criteria such as e.g. application QoS requirements, system parameters, battery power level, access system type, other systems availability, user activity patterns or predictive events. Where data can be abstracted and handled at lower layers, the sockets remain untouched.

The outputs of each connection socket $31_{a \ldots n}$ input to packet buffers which accommodate data while they await transmission to further stages of processing. Some buffer sizes may be variable in which case they are configured by the management unit 26 based on various indications such as e.g. predictive imminent signal quality deterioration, radio link quality or power levels. In the next stage are respective flow control modules $33_{a \ldots n}$ which are configured to control data flow. If TCP is used this implies variable transmission window size and TCP ACK coordination. An output packet buffer 36 provides an input to the modem interface layer 9. Each packet buffer $32_{a \ldots n}$ feeds data to a traffic demand profiling unit 70 which determines application demand for data transfer services in the management unit 26 and thence to the predictive logic and current functions module 25. The demand profiling unit 70 allows transmissions to be monitored and long term behaviour learnt so that individual transmissions from applications can be staggered appropriately to benefit from data aggregation that has reduced impact to overall user experience. An example is if an application is known to send periodic data transmissions that do not fully utilise the available interface capacity, other transmissions that are smaller and not periodic can be delayed to align with the known periodic transmissions. This does not degrade the user experience for the periodic application and the delay in aligning the other applications may not be so noticeable for the applications with small non-periodic data. Furthermore, periodic data transmissions can be recognised and shifted in time by a time period smaller than the data transmission period, by denying network access and then utilising a retry mechanism of the application to shift the transmission period to one that best coincides with peak signals, such as when travelling along a motorway, with known antenna locations.

The traffic manager 20 manages the flow control modules $33_{a \ldots n}$ and an output packet buffer 36. The output of each of the flow control modules 33$a \ldots n$ goes into respective packet buffers 34$a \ldots n$, the outputs of which are all combined in the serialisation and scheduling module 35 which is responsible for data serialisation and data scheduling based on e.g. application QoS and system requirements, radio link conditions, user preferences. An example embodiment of this module is shown in more detail in FIG. 3. The scheduling module 35 also receives an input from the management unit 26 and sends an output to the modem interface layer 9, via packet buffer 36. From the modem interface layer 9, there is an input to the radio modem and low protocol layers 10 for radio modem functions and lower protocol layers (L1/L2), which communicates with the radio link quality unit 27 and radio power monitoring unit 28.

A predictive function can be implemented in one of two ways. One is to measure the quality of the service to the wireless interface and create trends that can be extrapolated to determine if quality is improving and if the exchange of networked data should be delayed in case a better quality and therefore better throughput can be achieved by waiting, allowing the wireless interface to be powered on for a shorter time, consuming less total power. It is understood that such a prediction may not always result in a positive outcome and timers within the control logic would have to be implemented to ensure the data was exchanged within a reasonable period from the application request, or data generation, to satisfy the needs of the application and any user preferences for overall system quality. An alternative method of prediction can use signals informing mobile devices of other available networks in the local vicinity to determine if it is worth delaying data when a user is moving towards a network that is accessible by that mobile device and would provide lower power requirements to send the data. Such information may be received from a media independent handover service such as that described in IEEE 802.21. Other considerations include the radio conditions measurement aimed at checking how busy the network is and hence how likely it is that the terminal could be scheduled with a high data rate. An example of this is that the user device keeps a history of recent (uplink) scheduling commands to determine the uplink spectral efficiency. This may be combined with the transmit (Tx) power level and used to determine how much power is required to transmit a byte of information.

Figure 3:
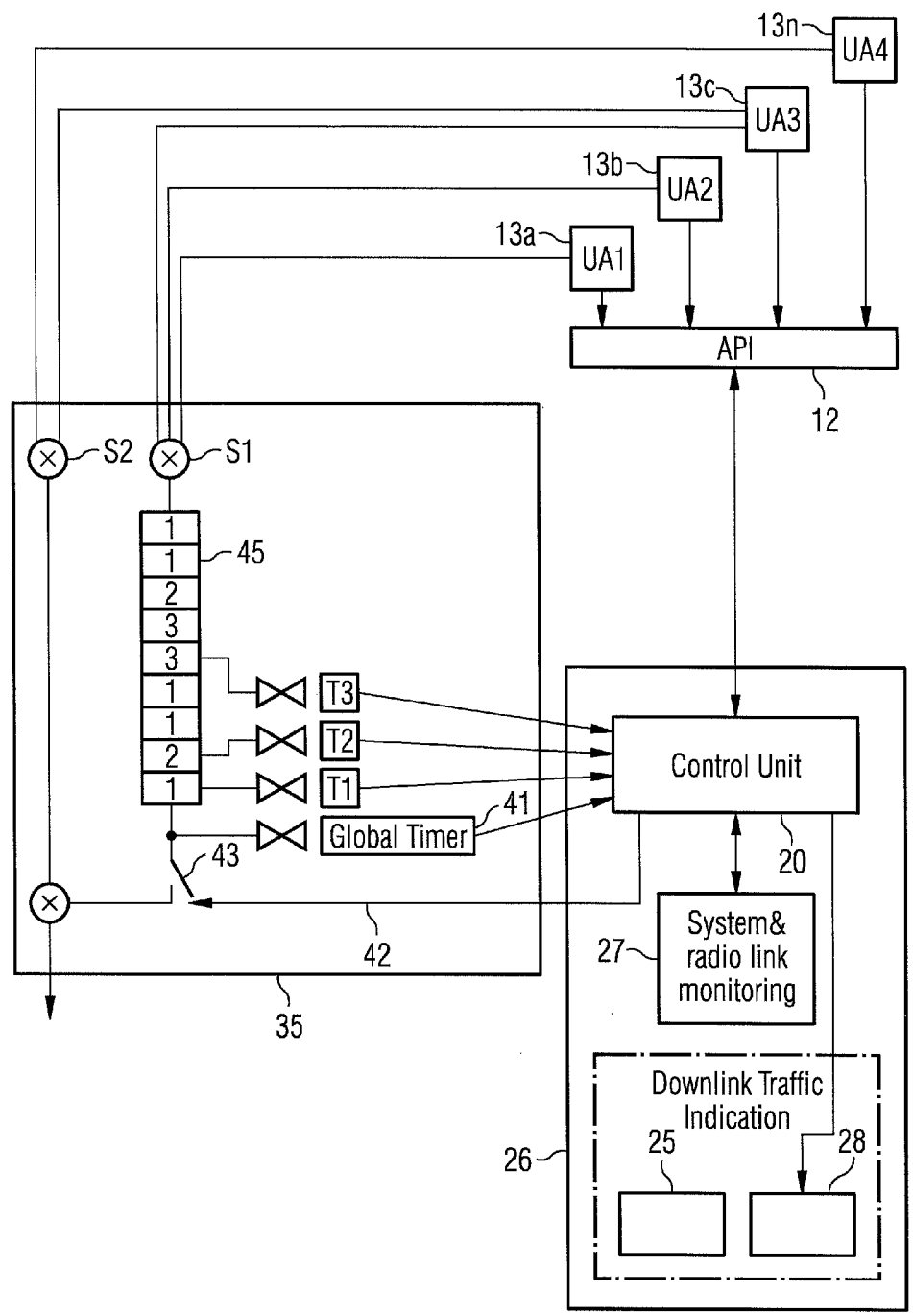
FIG. 3 illustrates in more detail the serialisation and scheduling function in the power manager of FIG. 2b.

An example of aggregated application data scheduling is illustrated with reference to FIG. 3. A simplified management unit 26 is shown, comprising system and radio link monitoring module 27, down link traffic indicators module 25, 28 and control unit 20. Modules 27, 25, 28 provide inputs to the control unit 20. A global timer 41 and independent timers T1, T2, T3, feed into the control unit 20 and an output 42 from the control unit causes a switch 43 to be open or closed. The timers T1, T2, T3, are for maximum allowed waiting time for application data, controlled by the user applications UA1 to UA4 and the control unit 20. The API 12 interfaces between the control unit 20 and user applications 1 to 4 with respective data applications UA1 to UA4. User application UA4 is for high priority indications and user application UA3 is for high and low priority indicators. A first mixer 51 takes low priority data applications DA1 to DA3 and feeds them back through a queue with independent timers 45 and a second mixer 52 combines the high priority data applications DA3 and DA4 straight through to an aggregated data pipe 46.

Figure 4:
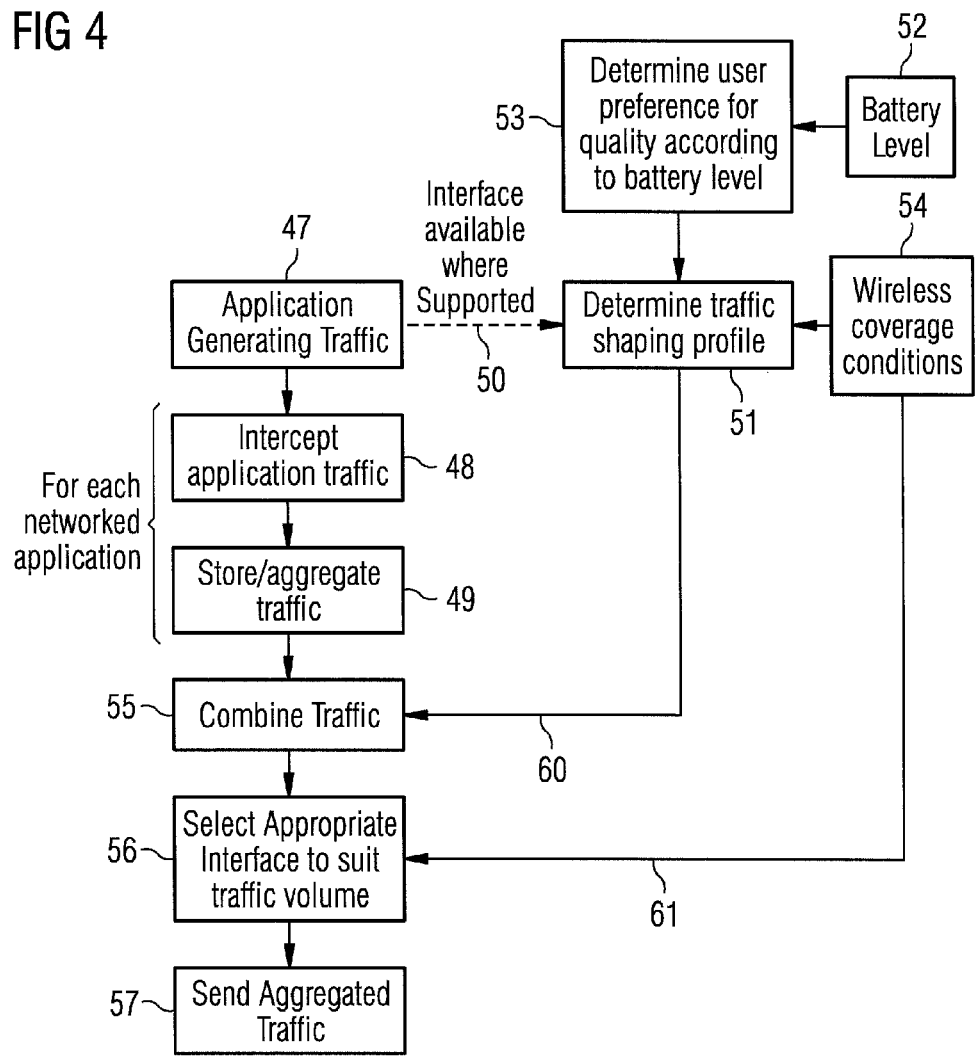
FIG. 4 is a block diagram illustrating operation of the method of the present invention.

FIG. 4 is a flow chart illustrating one example of operation of the invention. An application generates traffic for each networked application and traffic is intercepted 48 and stored or aggregated 49. Where supported, an interface 50 between the application 47 generating the traffic and a module 51 to determine a traffic shaping profile is provided. Battery level 52, determined user preferences 53 for quality according to the battery level feed into the determination of the traffic shaping profile, along with wireless coverage conditions 54. Traffic is combined 55 from the stored/aggregated traffic 49 and the determined traffic shaping profile 51 is applied 60, then the appropriate interface is selected 56, taking into account wireless conditions 54 which have been applied 61, and the aggregated traffic is sent 57.

This invention extends user control of a mobile device so that interfaces and functionality can be switched on or off according to a defined level of remaining battery capacity by allowing the user to define a level of device performance (or service quality) according to the remaining battery level, where the user can select a performance level between 'highest performance' and 'longest battery life' using a slider interface and that setting is used to determine how the traffic shaping, TCP control traffic reduction and interface selection algorithms are configured. FIG. 5 shows an example of user preference setting to support high performance A1 when the battery is mostly full, but aggressively limit performance A4 when the battery level is very low. As illustrated by FIG. 5, the selection of highest performance allows the mobile device to operate in the normal way without any traffic shaping or TCP control traffic reduction taking place and the interface selection algorithm preferring the interface with the highest throughput. The longest battery life profile allows for traffic shaping and TCP control traffic reduction to manage the traffic flow aggressively, resulting in reduced performance and a perceived loss of service quality, but done at the users request for battery levels where the user has previously selected the preference of reduced quality and improved battery life.

FIG. 5 shows example thresholds at which the transition from managing the power consumption for performance of the device moves forwards managing consumption for battery life. However, these levels may be varied without detracting from the scope of the invention. At more than 75% battery level A1, generally usage of the device will depend on optimising performance according to the user requirement. Between 75% and 50% A2 and also between 50% and 25% A3 battery level, the emphasis moves increasingly toward managing for battery life, until at less than 25% A4 battery level, performance concerns are insignificant compared with the need to preserve battery for essential communications. This gives the user a degree of choice in respect of loss of performance against battery life, which is not available in conventional network controlled traffic management.

Figure 6:
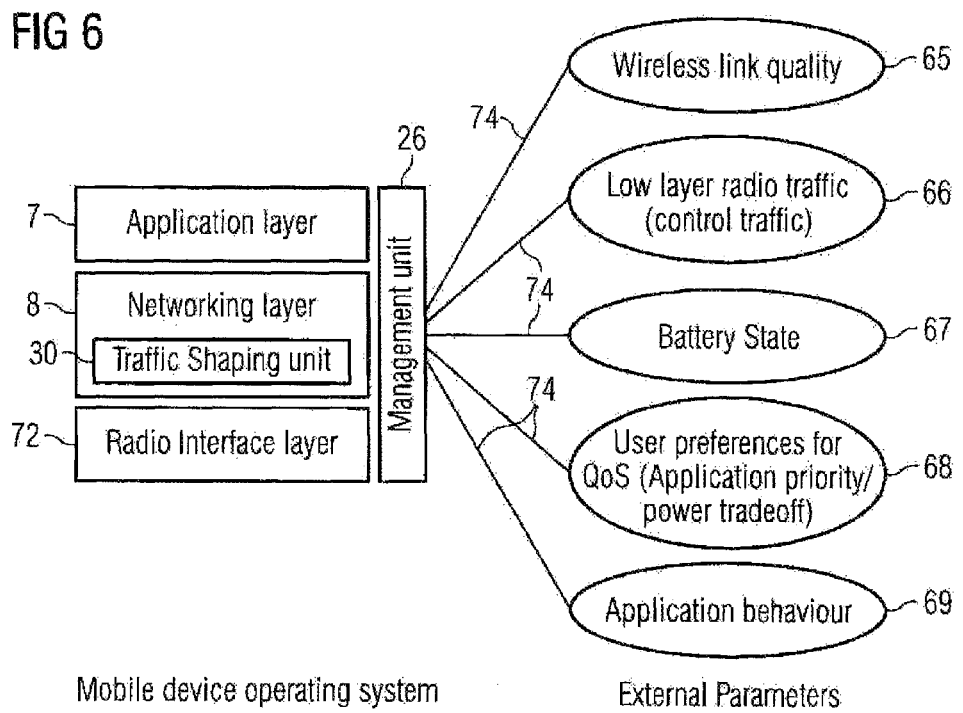

The present invention is able to be integrated into existing architectures as illustrated in FIG. 6, without any requirement for network cooperation to implement this. For example in an existing application layer 7, networking layer 8 and radio interface layers 72, a traffic shaping unit 30 is incorporated into the networking layer and a management unit 26 across all three layers. The management unit 26 receives inputs 74 from external parameters relating to some or all of the wireless link quality 65 low layer radio traffic (control traffic) 66, battery state 67, user preferences for QoS (application priority or trade-off) 68 and application behaviour 69. There may be other parameters which can be provided in addition.

The requirement to perform traffic shaping, TCP control traffic reduction and interface selection functions for power saving is applicable to devices that incorporate wireless interfaces that consume a considerable proportion of the complete device power. In most implementations, the wireless interface can support a variety of throughput rates but in many, the power consumption requirement does not change linearly with throughput usage. Some schemes offer dynamic modulation schemes that allow some aspect of power control and processing power management, but in general these interfaces are more efficient when thought of in terms of energy required to send a bit of data when operated at their maximum throughput. Combining this requirement with intelligent management of the traffic or data to be transferred over the wireless interface can mean that the wireless interface efficiency can be improved by mostly using it for high capacity data transfer. This can be achieved through data aggregation and by intelligently removing some control data that the protocols can manage without. Furthermore, it can be beneficial to select the wireless interface from a choice of available interfaces to provide the lowest power per bit of data for the instantaneous data requirements.

Additionally, there may be provided a user interface to the power management function described above, where the user can define a profile that determines the operation of traffic shaping, TCP control traffic reduction and interface selection functions according to remaining battery level, allowing the user to manage the user experience according to the remaining battery life of the mobile device. The profile may consist of multiple user preference settings assigned to varying levels of remaining battery level.

The invention extends user control of a mobile device so that interfaces and functionality can be switched on or off according to a defined level of remaining battery capacity by allowing the user to define a level of device performance (or service quality) according to the remaining battery level, where the user selects a performance level between 'highest performance' and 'longest battery life' using a slider interface and that setting is used to determine how the traffic shaping, TCP control traffic reduction and interface selection algorithms are configured. FIG. 5 shows an example of user preference setting to support high performance when battery is mostly full, but aggressively limit performance when battery level is very low. As illustrated by FIG. 5, the selection of highest performance allows the mobile device to operate in the normal way without any traffic shaping or TCP control traffic reduction taking place and the interface selection algorithm preferring the interface with the highest throughput. The longest battery life profile allows for traffic shaping and TCP control traffic reduction to manage the traffic flow aggressively, resulting in reduced performance and a perceived loss of service quality, but done at the users request for battery levels where the user has previously selected the preference of reduced quality and improved battery life.

An application interface that allows applications to make best use of the traffic management function described above may do this by providing status reports of traffic management to the application so that the application can determine the difference between network connectivity issues and reduced performance caused by traffic management functions.

An application interface can be provided to the application with an application specifically written to listen or enquire the interface. The interface may provide details of the expected throughput and latency that result from the current traffic management scheme being used to suit the user's settings of quality and battery life expectation. Intelligent applications may be written to understand the mobile environment and only utilise the wireless interfaces when absolutely necessary, and in such a way that they best make use of the resources available to them, such as audio/video streaming.

An application interface that allows applications to request a preferred level of service quality for the exchange of networked data where it is possible for an application to register multiple network connections, each with an independent quality level may be provided. The application interface can provide a network connection mechanism that associates the priority of the data with the logical connection. Through this mechanism, applications may be created to differentiate network data of varying priorities to improve the performance of any underlying traffic shaping function and appropriately schedule the different priority data types over the appropriate network connection.

Another option is to include an application behaviour monitoring component that can provide information on traffic statistics of each application to the traffic management function described above, so that the traffic management function can estimate the flow of traffic and manage the reporting of data volume to a scheduler of the connected network and make best use of available network capacity and minimize the power applied to the wireless interface.

It is possible to collect information of the networked data exchange requirements of each application and with this information find trends of wireless interface demand associated with each application. This information can be used to give early information about how much data may need to be exchanged over the wireless interface in the very near future and in wireless networks where network scheduling of the traffic is performed, the wireless interface can request allocation for data bandwidth in anticipation of the data that will imminently need to be sent. As the underlying data aggregation function will be causing delays that affect the quality of service (as requested by the user) it is preferable to operate such a scheme to inform network centric traffic schedulers in a timely manner of the required instantaneous capacity and cause no further data delays.

Reducing power consumption is a factor in improving battery life. Traffic shaping of individual applications to achieve global goal of power saving may be done by management of each individual connection to the internet, whilst statistical modelling of traffic flow in each connection may achieve best overall traffic management for low power. Use of external radio conditions allows determination of efficiency of data sending at each instant and allows users to select quality level according to battery level e.g. low quality, high latency, as illustrated in FIG. 5. The present invention can be constrained to fit into existing operating systems and adapted to fit existing architectures, allowing the benefits to be applied to existing devices without impacting any of the network infrastructure's implementation.

In contrast to prior art systems, the present invention allows traffic shaping of each individual application in order to aggregate traffic into bursts so that the radio resource can then benefit from sleep modes, or benefit from overheads associated with regular transmissions, such as control traffic. The present invention offers differing priorities and traffic shaping profiles to different applications to apply the power saving only to the applications for which the user is willing to tolerate some impact on performance. Since the implementation can be solely in the mobile device and does not require interaction with the network and is designed as such, the present invention operates above network scheduling functions with little impact on them and no requirement to integrate the power manager into core network functionality. This allows the traffic shaping to be fully managed by the mobile device user and alters performance of applications according to user preferences and expectation, rather than according to network decisions unknown to the user. The invention is designed so that it can be applied to data transfer only in a mobile device which supports both voice and data, avoiding impact on the voice connection quality.

The present invention provides information about the expected energy requirement, the data requirement and the duration required to transfer it over each interface, so ensuring that the interface that will consume least energy is selected. By combining interface selection with a traffic shaping function to create bursts of traffic, the bursted traffic can be aligned with the most appropriate interface offering the optimum energy/capacity tradeoff.

The invention claimed is:

1. A mobile device comprising:
a processor configured to implement a traffic manager configured to control transmissions from the mobile device;
wherein the traffic manager is configured to receive data from a plurality of uncoordinated user applications;
the traffic manager is further configured to receive external parameters, the external parameters including at least user preferences and battery level,
the user preferences including battery life and quality of service preferences for predetermined battery level thresholds;
the traffic manager is further configured to compare the battery level to the predetermined battery level thresholds to determine the user preferences for a current battery level;
the traffic manager is further configured to aggregate the received data from the plurality of uncoordinated user applications based on the determined user preferences; and
the traffic manager is further configured to output a signal comprising the aggregated data for transmission, wherein the signal is scheduled to be output based on a scheduled transmission time of a transmission associated with one of the plurality of uncoordinated user applications.

2. The mobile device according to claim 1, wherein the traffic manager is configured to generate a respective traffic shaping function for each of the plurality of uncoordinated user applications in response to at least one of the external parameters.

3. The mobile device according to claim 1, wherein the traffic manager is configured to generate a single traffic shaping function to apply to the plurality of user applications.

4. The mobile device according to claim 3, wherein the single traffic shaping function has an effect of reducing regularity of transmission of signals.

5. The mobile device according to claim 4, wherein the single traffic shaping function is configured to align signal transmissions with control traffic of the mobile device.

6. The mobile device according to claim 1, wherein the signal is aligned with control traffic of the mobile device.

7. The mobile device according to claim 1, wherein the traffic manager is configured to generate a traffic shaping function based on at least one of wireless link quality, low layer radio traffic, battery state, and application behavior.

8. The mobile device according to claim 1, wherein the traffic manager is configured to determine user requirements from the external parameters.

9. The mobile device according to claim 1, wherein the traffic manager spans a radio interface layer.

10. The mobile device according to claim 1, wherein the traffic manager is configured to monitor transmission control protocol internet protocol (TCP-IP) user traffic acknowledgements and the traffic manager is configured to block transmission of the acknowledgments.

11. The mobile device according to claim 1, wherein the traffic manager is further configured to control an output of the mobile device to offer options or warnings to a user.

12. The mobile device according to claim 11, wherein the output is configured to provide an audible, or visual, or tactile warning.

13. The mobile device according to claim 11, wherein the output is a loud speaker, a display or a motive unit of the mobile device.

14. A method of traffic management in a mobile device, the method comprising:
  receiving data from a plurality of uncoordinated user applications at a traffic manager of the mobile device;
  receiving external parameters at the traffic manager of the mobile device, the external parameters comprising at least user preferences and battery level, the user preferences including battery life and quality of service preferences for predetermined battery level thresholds;
  comparing, via the traffic manager, the battery level to the predetermined battery level thresholds to determine the user preferences for a current battery level;
  aggregating the data received from the plurality of uncoordinated user applications based on the determined user preferences; and
  outputting, via the traffic manager, a signal comprising the aggregated data for transmission, wherein the signal is scheduled to be output based on a scheduled transmission time of a transmission associated with one of the plurality of uncoordinated user applications.

15. The method according to claim 14, further comprising:
  checking predetermined settings for each of the external parameters;
  comparing requirements for a requested service with the predetermined settings and the battery level; and
  generating a traffic shaping function based on the comparison.

16. The method according to claim 15, further comprising applying the traffic shaping function to the data to modify format of transmission.

17. The method according to claim 15, wherein the generating the traffic shaping function is further based on two or more of radio link quality, application behavior, radio interface control-traffic requirements, and battery state.

18. The method according to claim 15, wherein the external parameters comprise user quality of service levels.

19. The method according to claim 15, wherein transmissions are scheduled to start aligned with control traffic or on receipt of downlink traffic.

20. The method according to claim 15, wherein an uplink transmission time is determined from a combination of one or more of application requirements, battery charge level, radio propagation conditions, presence of downlinks traffic and system specific parameters.

21. The method according to claim 15, wherein the mobile device operates a modified transmission control protocol (TCP) protocol, whereby transmission of TCP control information is reduced during periods of high data volumes.

22. The method according to claim 15, further comprising selecting an interface for transmission according to the external parameters.

23. The method according to claim 15, wherein an interface selection function determines which of a number of wireless interfaces are available for use.

24. The method according to claim 23, wherein the wireless interface selected is chosen to provide a lowest demand from a power source of the mobile device for a total time required to communicate instantaneous traffic demands.

* * * * *